3,110,021
SERVO LOOP CONTROL CIRCUIT ALARM SYSTEM

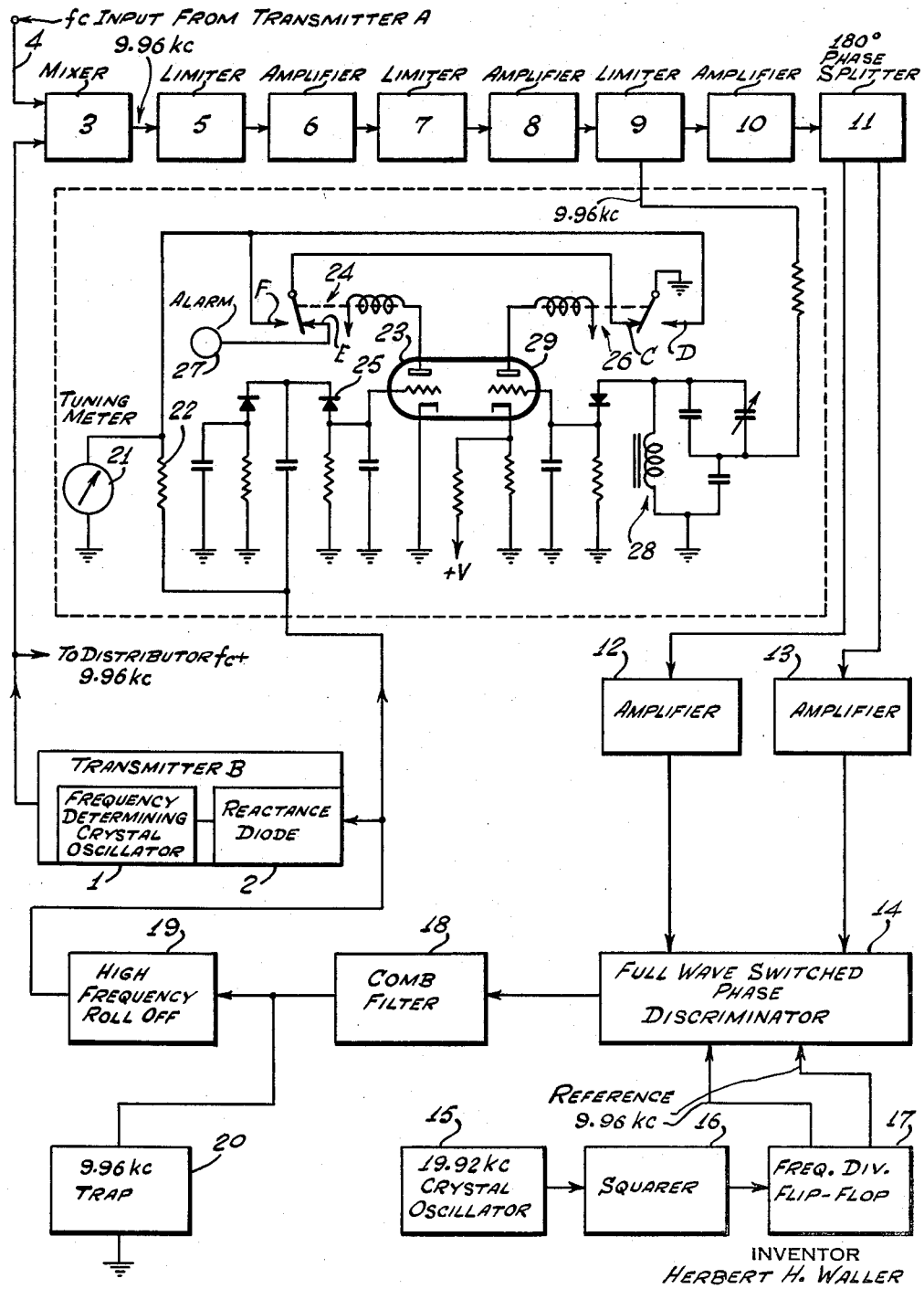

Herbert H. Waller, Hicksville, N.Y., assignor to Servo Corporation of America, New Hyde Park, N.Y., a corporation of New York
Filed Dec. 1, 1959, Ser. No. 856,605
6 Claims. (Cl. 340—248)

This invention relates to alarm circuits and more particularly to a fail-safe alarm circuit for a servo loop control circuit.

In navigation communication systems, it is often necessary to generate a signal having a frequency characteristic which differs by a constant amount from a signal emitted by a primary signal source. For example, in one type of omnirange system, a reference signal is generated at a given frequency difference from the primary signal. The radiated comparison signal is effectively rotated and a measurement at a remote location of the Doppler frequency of the rotated signal relative to a radiated reference signal provides an indication of the azimuth of the remote location relative to the signal sources.

In such systems, it is essential that the frequency difference between the radiated signals be held constant in spite of transmitter drift or other effects tending to affect the stability of either of the signal sources. In such systems one of the signal sources is made variable and may be "slaved" to the other or "master" signal source in order to maintain the desired "offset" or constant frequency difference. A servo loop circuit, such as described in copending application, Serial No. 855,315, filed November 25, 1959, for Sideband Selector, now Patent No. 3,023,370, is provided in which the output of a variable frequency generator source is mixed with the input signal from the master signal source to produce a difference frequency signal which is compared in phase with the output of a reference signal generator to provide a control signal to adjust and maintain the variable frequency generator output at a constant frequency separation relative to the master signal.

In such systems it is essential that an alarm be actuated in the event of failure of any of the components of the system or signal sources. Moreover, it is also desirable that the meters or indicators used in tuning the system be disabled during any periods when the servo loop control circuit is adjusting or tuning and locking-in the signal sources to obtain the desired frequency difference.

One of the objects of this invention, therefore, is to provide an alarm signal circuit responsive to abnormal conditions in a servo loop control circuit.

Another object of this invention is to provide an alarm signal circuit responsive to departures from a given frequency difference between two input signals.

Still another object of this invention is to provide an alarm circiut responsive to variations in the control signal of a phase locked servo loop.

A further object of this invention is to provide a fail safe alarm signal circuit for a phase locked servo loop which renders the tuning indicators inoperative and gives an alarm signal responsive to a failure of any component of the servo loop or any failure in the input signal sources.

One of the features of this invention is the provision of a first and second relay, each actuated by a signal developed in a phase locked servo loop. The first relay is actuated by the output of a filter tuned to the difference frequency and the second relay is actuated by the absence of changes in the control signal in the servo loop. The two relays and their associated contacts are contained in a circuit with the tuning and alarm devices to provide a monitoring circuit for the system. The deactivation of either relay disables the tuning devices and causes the alarm devices to give an indication of the abnormal conditions.

The above-mentioned and other features and objects of this invention will become more apparent by reference to the following description taken in conjunction with the accompanying drawing, in which the FIGURE is a schematic drawing, partly in block form of one embodiment of the alarm circuit of this invention for use with a phase locked servo loop control for maintaining a constant frequency difference between two signal sources.

Referring to the drawing, a phase locked servo loop controlling a variable frequency generator to maintain a constant offset frequency relative to another signal source, is shown to include an alarm circuit, in accordance with the principles of this invention. The variable frequency signal source or generator, transmitter "B," comprises an oscillator 1 capable of generating signals over a range of frequencies. In accordance with well known engineering principles, a reactance device or control device 2 is associated with the oscillator 1, to adjust the frequency of the signal output thereof. The output of the oscillator 1 is coupled to a mixer circuit 3. A signal $f_c$ from a "master" signal source, transmitter "A," is coupled as the other input to the mixer 3 over line 4. The control circuit of the phase locked servo loop, "slaves" the frequency output of the oscillator 1 to the "master" signal from transmitter "A" to maintain a constant frequency difference between the signals. The mixer 3 develops a signal output proportional to the difference in frequency between the signal inputs thereto. The output of the mixer 3 is coupled through the limiter-amplifier chain, composed of limiters 5, 7 and 9 and amplifiers 6 and 8. The limiters provide a signal of constant amplitude and phase independent of the transmitter power. The output of the final limiter 9 is amplified in circuit 10 and coupled to the 180° phase splitter circuit 11 which converts the replica of the difference signal into a two channel push-pull output. The output of the phase splitter 11 is coupled through push-pull amplifiers 12 and 13 which provide sufficient drive for the full wave switched phase discriminator 14. The other input to the phase discriminator 14 is developed in a reference signal source 15 which operates at twice the desired offset frequency. The reference signal from oscillator 15 is coupled to a squarer 16 which converts the output of oscillator 15 into a waveform suitable for triggering the frequency divider circuit 17. The circuit 17 is preferably a flip-flop frequency divider stage which provides a push-pull output at the offset or difference frequency. The output from 17 is utilized as the reference signal in the phase discriminator circuit 14 for chopping the inputs from the amplifiers 12—13 into pulses which are integrated and subtracted from each other. The output of the phase discriminator 14 is a signal proportional to the phase or frequency difference between the output signals of mixer 3 and the frequency divider 17, and serves as the control signal for the servo loop.

The control signal from the phase discriminator 14 is coupled through "comb" filter 18 and the high frequency roll off circuit 19. A filter trap 20 tuned to the offset frequency is provided between the filter circuits 18 and 19 and ground. The "comb" filter 18 comprises a group of tuned networks coupled in series and tuned to the second, fourth, sixth and tenth harmonics of the offset frequency. The high frequency roll-off circuit 19 accomplishes greater attenuation of the signal's high frequency components which are already low in amplitude. The "comb" filter 18, high frequency roll-off 19 and trap 20 are designed to minimize the phase lag while providing maximum filtering for the control signal. Thus, the unique use of the "comb" filter circuit 18 in the feed back loop provides a fast frequency response without loss of ripple reduction and phase correction of the controlled transmitter.

The correct operation of this circuit may be monitored by reading the D.C. control voltage. This is accomplished by coupling the control voltage to a suitable meter 21 through series resistor 22. When the circuit is "locked in" the meter 21 indicates a voltage which is dependent on the tuning of the oscillator 1 and thus permits adjusting the tuning to provide that the oscillator 1 will be able to vary its frequency output on both sides of its tuned frequency to compensate for frequency variations both above and below the desired offset frequency.

For small departures from lock-in, the normal D.C. control voltage output of the discriminator 14 contains an A.C. component. In order to limit meter deflection to operation only during the locked-in condition of the circuit, the monitor or alarm circuit is provided. It should be recognized that the A.C. component of the D.C. control signal is equal to the frequency error between the output of the mixer 3 and the frequency divider 17. This frequency error is equal to zero in the locked-in condition. In order to short out the meter 21 and prevent tuning during periods when the circuit is not locked-in a triode 23 is provided. When the circuit is in the phase locked operating condition the triode 23 is normally operating or conducting because it is at zero bias. A relay 24 is coupled in the plate circuit of the triode 23 and when triode 23 is conducting the armature of the relay 24 is coupled to contact E. As the circuit departs from the locked-in condition, the A.C. component present in the control signal is rectified by the crystal diode 25 and a biasing voltage is coupled to the grid of the triode 23 which cuts it off. When the triode 23 ceases to conduct, the armature of relay 24 is released and makes contact with F, thus shorting out the meter 21 by connecting it through contact C and the armature of the relay 26 which is coupled to ground. Simultaneously, the release of the armature of relay 24 interrupts the normally grounded condition of an alarm device 27, causing an alarm to occur. The exact nature of the alarm, of course, will depend on the particular alarm device employed, which will vary in accordance with the application of the invention. In some applications the alarm device might be a light, in other applications it might be a bell or some other alarm device. It will be appreciated by those skilled in the art that any suitable alarm device can be actuated by the contacts of relay 24.

During normal operation of the phase locked servo loop circuit the output of limiter 9 will be at the difference frequency. This output of limiter 9 is coupled to the tuned circuit 28 which provides an output coupled to the grid of triode 29. The fixed cathode bias of the triode 29 is overcome by the positive grid bias voltage coupled from the tuned circuit 28 when the difference frequency output of the mixer 3 is equal to the frequency to which the circuit 28 is tuned. Thus, when the system is functioning properly, the grid bias voltage causes triode 29 to conduct. The conduction of triode 29 under normal conditions maintains the armature of relay 26 in contact with C. Should a large departure from lock-in condition occur, the output of limiter 9 will be materially different from the frequency difference. Thus, the output of the tuned circuit 28 will be reduced sufficiently to permit the fixed cathode bias of triode 29 to cut-off the triode and thus release the armature of relay 26 which would then make contact with D. When the armature of relay 26 is coupled to contact D, the meter 21 is shorted out and the normally grounded condition of the alarm device 27 is interrupted. Thus, if either the control signal contains an A.C. component indicative of small departures from lock-in or if the output of the mixer 3 materially departs from the difference frequency the tuning meter is shorted out and the alarm device is actuated.

The circuit above described is completely "fail-safe" in its operation. Should either relay miss or develop a poor contact, an alarm is given since the release of the armatures causes the alarm to be rendered. Any failure of any circuit component or a failure in the original signal generators will cause the alarm to be rendered since large departures from the lock-in condition would occur.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A fail-safe alarm circuit for use in combination with a frequency control servo system having a variable frequency signal whose frequency indicates the value of a first parameter associated with said servo system and a variable amplitude signal whose amplitude indicates the value of a second parameter associated with said servo system, said alarm circuit comprising first and second relay means and first and second relay energizing means each coupled to a corresponding relay means, each of said relay energizing means being adapted to normally energize the corresponding relay means, and each of said relay energizing means having an input terminal and being adapted to de-energize the corresponding relay means when actuated by an input signal applied to the input terminal thereof, resonant circuit means coupled to the input terminal of one of said relay energizing means, said resonant circuit means being adapted to receive said variable frequnecy signal and to actuate the corresponding relay energizing means when the frequency of said signal reaches a predetermined threshold value, input circuit means coupled to the input terminal of the other relay energizing means, said input circuit means being adapted to receive said variable amplitude signal and to actuate the corresponding relay energizing means when the amplitude of said signal reaches a predetermined threshold value, an alarm device coupled to at least one of said relay means, and said relay means being adapted to actuate said alarm device when de-energized, thereby producing a fail-safe alarm whenever said first or second parameters reach respective predetermined values.

2. The combination defined in claim 1, and also including a meter coupled to said input circuit means to receive said variable amplitude signal, said meter being coupled to at least one of said relay means, and said relay means being adapted to disable the input to said meter when either of said relay means are de-energized.

3. The combination defined in claim 1 wherein said first and second relay energizing means each comprise electronic amplifier means having an input and an output, the output of each electronic amplifier means being coupled to the corresponding relay means, the input of one electronic amplifier means being coupled to said resonant circuit means, and the input of the other electronic amplifier means being coupled to said input circuit means, and wherein said resonant circuit means comprises a resonant circuit tuned to said predetermined threshold frequency and a rectifier coupled to said resonant circuit, the output of said rectifier being coupled to the input of said one electronic amplifier means, and said resonant circuit being adapted to receive said variable frequency signal.

4. The combination defined in claim 3 wherein said variable amplitude signal is an A.C. signal and wherein said input circuit means comprises a rectifier having an input and an output, the output of said rectifier being coupled to the input of said other electronic amplifier means, and the input of said rectifier being adapted to receive said variable amplitude signal.

5. The combination defined in claim 4 wherein said alarm device is coupled to one of said relay means and wherein said relay means are interconnected in such manner as to actuate said alarm device when either of said relay means are de-energized.

6. The combination defined in claim 5 wherein said variable amplitude signal comprises an A.C. signal superimposed on a D.C. level, and also including a meter coupled to the input of said input circuit means to receive and to measure said D.C. level, said meter being coupled to at least one of said relay means, and said relay means being adapted to disable the input to said meter when either of said relay means are de-energized.

References Cited in the file of this patent

UNITED STATES PATENTS

| | | |
|---|---|---|
| 2,044,749 | Usselman | June 16, 1936 |
| 2,207,540 | Hansell | July 9, 1940 |
| 2,505,465 | Deketh | Apr. 25, 1950 |
| 2,975,272 | Renick et al. | Mar. 14, 1961 |